United States Patent [19]

Kwon

[11] Patent Number: 5,497,239
[45] Date of Patent: Mar. 5, 1996

[54] DIGITAL VIDEO SIGNAL RECORDING/REPRODUCING APPARATUS HAVING MULTIPLE RECORDING AND REPRODUCING PATHS

[75] Inventor: Oh-Sang Kwon, Seoul, Rep. of Korea

[73] Assignee: Daewoo Electronics Co., Ltd., Seoul, Rep. of Korea

[21] Appl. No.: 253,479

[22] Filed: Jun. 3, 1994

[30] Foreign Application Priority Data

Jun. 4, 1993 [KR] Rep. of Korea .................. 1993/10123

[51] Int. Cl.$^6$ ..................................................... H04N 5/76
[52] U.S. Cl. ........................................... 358/335; 358/342
[58] Field of Search ................................. 358/342, 335, 358/310; 348/384, 405, 412, 415, 418

[56] References Cited

U.S. PATENT DOCUMENTS 5,140,437  8/1992  Yonemitsu et al. ...................... 358/342
5,262,877  11/1993  Otsuka ..................................... 358/343

*Primary Examiner*—Tommy P. Chin
*Assistant Examiner*—Robert Chevalier
*Attorney, Agent, or Firm*—Anderson Kill Olick & Oshinsky

[57] ABSTRACT

An apparatus having a recording and reproducing unit for recording and reproducing an encoded video signal received from a transmitter comprises a first, a second and a third recording paths through which the encoded video signal is processed in a first recording mode, a second recording mode and a third recording mode in order to selectively record the processed video signal; and a fourth, a fifth and a sixth reproduction paths through which the video signal recorded in the first, the second or the third recording mode is retrieved by the recording and reproducing unit and processed for the displaying thereof.

2 Claims, 2 Drawing Sheets

DIGITAL VIDEO SIGNAL RECORDING/REPRODUCING APPARATUS HAVING MULTIPLE RECORDING AND REPRODUCING PATHS

FIELD OF THE INVENTION

The present invention relates to an apparatus for recording and reproducing a digital video signal; and, more particularly, to an apparatus for recording and reproducing video signals through the respective selected paths from a plurality of recording paths and reproducing paths.

DESCRIPTION OF THE PRIOR ART

As is well known, a digital video tape recorder ("VTR") records and reproduces a video signal in a digital form. The digital video signal may be a pulse code modulated ("PCM") signal which is obtained by performing a sampling operation on the video signal in such a manner that satisfies the so-called Nyquist condition. The digital VTR of the type described above is disclosed in an article entitled "Digital Video Recording Techniques Using ½" Metal Particle Tape" by S. Mita et al., *IEEE Consumer Electronics*, pages 386–397 (August, 1985).

In a digital video transmission system, the digital video signal can be processed by using a conventional encoding system to produce a compressed video signal. The conventional encoding system may employ various video compression techniques for the transmission of digital video signals through a conventional communication channel. The compressed digital video signal, transmitted to a receiving end, may be directly applied to the digital VTR for its recording, or may be processed through a decoding system to produce, e.g., a PCM signal for the recording thereof.

SUMMARY OF THE INVENTION

It is a primary object of the invention to provide an apparatus capable of recording and reproducing a digital video signal via selected paths out of multiple recording and reproducing paths.

In accordance with the present invention, there is provided an apparatus having a recording and reproducing unit for recording and reproducing an encoded video signal received from a transmitter, which comprises a first means for passing the encoded video signal for the recording thereof in a first recording mode; a second means for processing the encoded video signal to produce a decoded video signal for the recording thereof in a second recording mode; a third means for processing the encoded video signal to produce an intra-mode compressed video signal for the recording thereof in a third recording mode; an input selector for selectively providing the video signal from the first, the second or the third means to the recording and reproducing unit for the recording thereof in the first, the second or the third recording modes; a mode detection and distribution unit for detecting the recording mode of the video signal and distributing the video signal in accordance with the detected recording mode; a fourth means for processing the video signal distributed thereto for the reproduction thereof, wherein the video signal is the encoded video signal recorded in the first recording mode; a fifth means for directly providing the video signal distributed thereto for the reproduction thereof, wherein the video signal is the decoded video signal recorded in the second recording mode; and a sixth means for processing the video signal distributed thereto for the reproduction thereof, wherein the video signal is the intra-mode compressed video signal recorded in the third recording mode.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
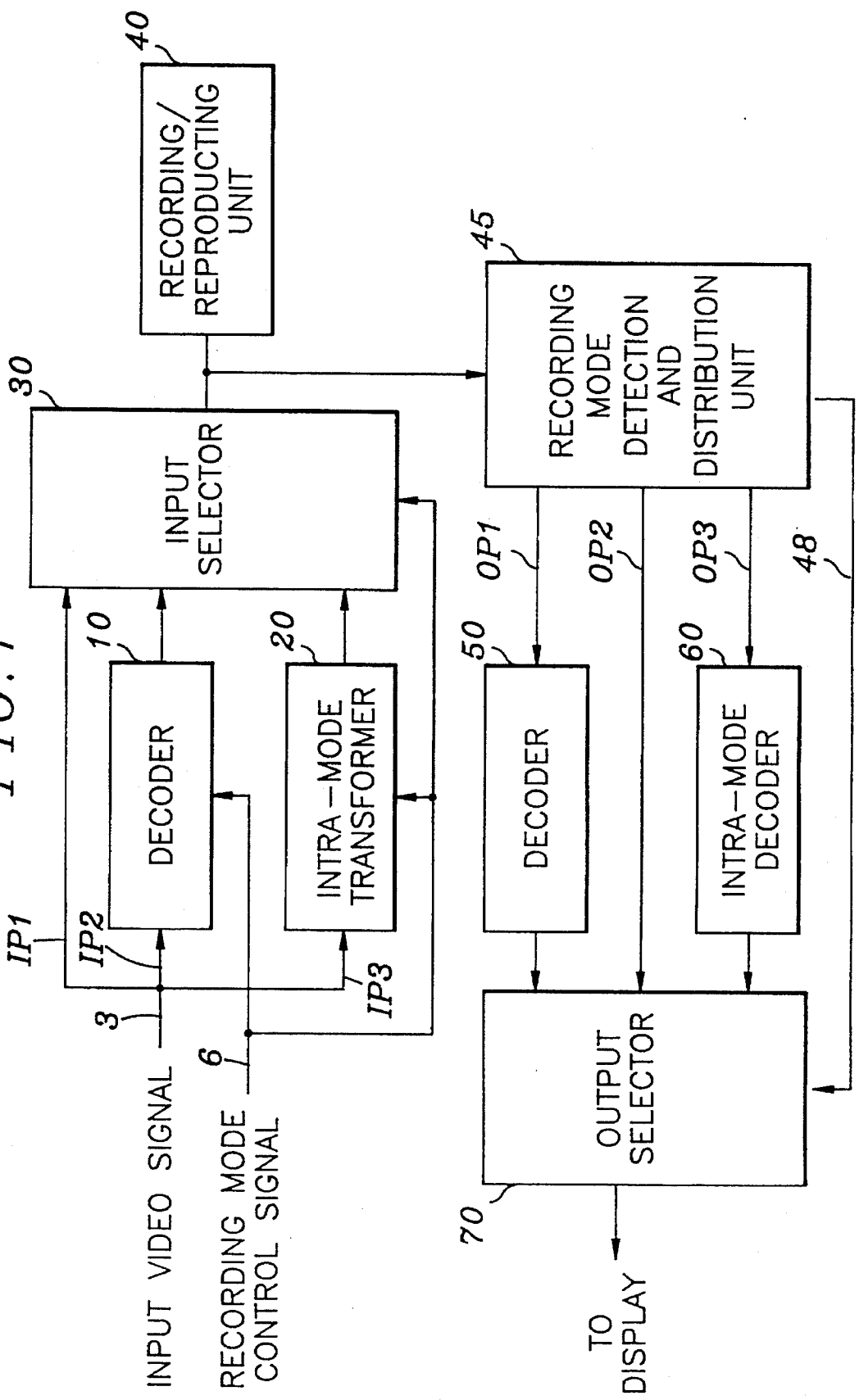
FIG. 1 is a block diagram of an apparatus for recording and reproducing a digital video signal in accordance with the present invention.

Referring to FIG. 1, there is shown a block diagram of an apparatus for recording a digital video signal through a selected path and reproducing the recorded video signal through a selected path from a multiple number of recording and reproducing paths in accordance with the invention.

An input digital video signal is supplied through line 3 to the apparatus for the recording thereof on a recording medium (not shown). The input digital video signal may include an encoded video signal received from a conventional encoding system located in a transmitter. The conventional encoding system uses a video compression technique for the transmission of digital video signals through a conventional communication channel. Such compression techniques can be classified into three categories.

A first category of compression techniques is the so-called predictive method, also known as the interframe coding, which is based on the concept of reducing the redundancy between neighboring frames. This method is described, for example, in Ninomiya and Ohtsuka, "A Motion-Compensated Interframe Coding Scheme for Television Pictures", *IEEE Transactions on Communications, COM*-30, No. 1 (January 1982), which is incorporated herein by reference.

A second category of coding methods comprises a transform technique which utilizes the redundancy existing in a single frame. This coding technique, which exploits only the spatial correlation, is called the intraframe coding. This technique is described in Chen and Pratt, "Scene Adaptive Coder", *IEEE Transactions on Communications, COM*-32, No. 3 (March 1984), which is incorporated herein by reference.

A third category of the compression techniques is built on the concept of combining the first and the second categories of techniques (see Staffan Ericsson, "Fixed and Adaptive Predictors for Hybrid Predictive/Transform Coding", *IEEE Transactions on Communications, COM*-33, No. 12 (December, 1985)), which is also incorporated herein by reference.

The encoded video signal on line 3 is selectively supplied to a first, a second and a third recording paths IP1, IP2 and IP3. The second and the third paths have a decoder 10 and an intra-mode transformer 20, respectively.

In accordance with the present invention, the selection of the recording paths is controlled by a recording mode control signal which is provided through line 6. The recording mode control signal is generated by way of a user selection. The recording mode control signal serves to select the recording path so that the decoder 10 and the intra-mode transformer 20 are activated in accordance with the recording mode signal supplied thereto, respectively.

When the first recording path is selected by the recording mode control signal, the encoded video signal is directly supplied to an input selector 30 in accordance with the first recording mode and then recorded onto a recording medium, e.g., a videotape, via a recording and reproducing unit 40. And, when the second recording path is selected by the recording mode control signal, the encoded video signal on the second path IP2 is passed to the decoder 10 which processes the encoded video signal to produce a decoded video signal for the recording thereof in a second recording mode. The decoded video signal is applied to the input selector 30. Further, when the third recording path is selected by the recording mode control signal, the encoded video signal on the third path IP3 is sent to the intra-mode transformer 20 which processes the encoded video signal to produce an intra-mode compressed video signal for the recording thereof in a third recording mode, which will be further illustrated with reference to FIG. 2. The intra mode compressed video signal is also applied to the input selector 30.

It will be appreciated that the video signal to be recorded through the first recording path will have a superior recording efficiency to the video signal to be recorded through the second or the third recording path since the video signal is provided in a fully encoded form. Similarly, the video signal to be recorded through the second recording path will have a better recording efficiency than the video signal to be recorded through the third recording path.

The recording mode control signal is also provided to the input selector 30. In response to the recording mode control signal, the input selector 30 selects a corresponding video signal to the first, the second or the third recording mode and provides the selected video signal to the recording and reproducing unit 40 for the recording of the selected video signal. During the recording operation, the recording mode control signal is also recorded along with the selected video signal in order to indicate each of the first, the second and the third recording modes or each of the recording paths.

The decoder 10 is of a conventional design which performs the inverse of the encoding operation performed by any one of the encoding systems as described above. The decoder 10 produces the decoded video signal which may be a pulse code modulated ("PCM") signal defining a sequence of video frames, each frame being defined by a set of pixel data.

Figure 2:
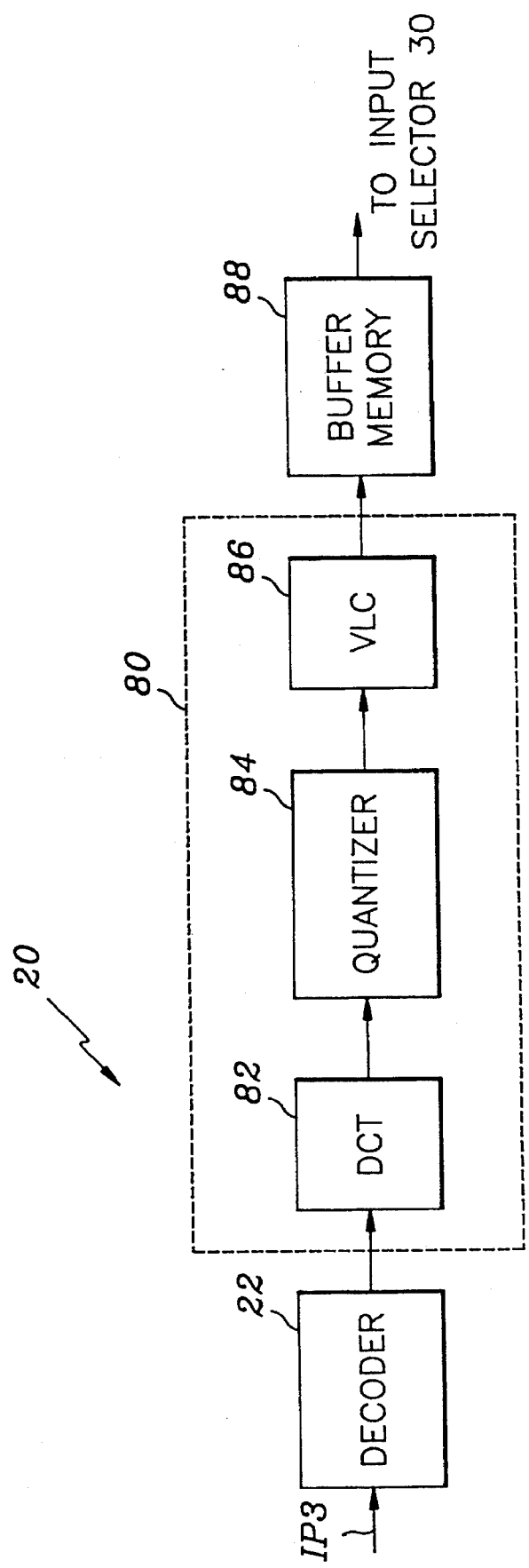
FIG. 2 is a detailed block diagram of the intra mode transformer shown in FIG. 1.

In FIG. 2, the intra-mode transformer 20 is further illustrated in a block diagram. The intra-mode transformer 20 includes a second decoder 22 which is identical to the decoder 10 described in FIG. 1, and an encoder block 80. In the encoder block 80, the decoded video signal from the second decoder 22 is subjected to an encoding process. In accordance with the present invention, the encoder block 80 is designed to process the decoded video signal in an intraframe coding mode using a spatial correlation without motion compensation to produce an intra mode compressed signal. The encoder block 80 comprises a discrete cosine transform ("DCT") coder 82, a quantizer 84 and a variable length coder ("VLC") 86. These are conventional elements used in a DCT compression system, as described in the Chen and Pratt article referred to above. In order to carry out the DCT compression, each video frame is divided into blocks of pixels (usually N×N sized square blocks). Each block of pixels is transformed by the DCT transform coder 82 into a set of intra-mode transform coefficients. The set of transform coefficients is quantized by the quantizer 84 using a quantization step size into an intra-mode quantization signal and then supplied to the VLC 86. The VLC 86 assigns a variable length codeword to the intra-mode quantization signal to produce at its output end the intra-mode compressed signal. The VLC 86 is also described in the Chen and Pratt article. In this case, since the encoder block 80 can be implemented with the intraframe coding part only from any one of the above encoding systems except for the encoding system using the interframe coding, it is possible to simplify the encoder block 80 in its circuit configuration. The intra mode compressed signal from the VLC 86 is sent to the input selector 30 through a buffer memory 88. In this connection, there is disclosed an apparatus for recording and reproducing the intra-mode compressed video signal in a copending, commonly owned application, U.S. Ser. No. 08/231,931, entitled "DIGITAL VIDEO SIGNAL RECORDING/REPRODUCING APPARATUS FOR LONGER PLAYING TIME", which is incorporated herein by reference.

Hereinafter, the reproducing operation of the present embodiment will be explained. When the reproducing operation is performed in the apparatus of the preferred embodiment of the present invention, the recording/reproducing unit 40 retrieves the video signal recorded on the recording medium in one of the recording modes. The retrieved video signal is supplied to a recording mode detection and distribution unit 45. The mode detection and distribution unit 45 detects the recording mode of the retrieved video signal and distributes the retrieved video signal to a corresponding reproducing path in accordance with the detected recording mode. That is, first, in case where the retrieved video signal is the encoded video signal recorded in the first recording mode, the retrieved encoded video signal is sent to a third decoder 50 through line OP1. The third decoder 50 has the same construction as the decoder 10 disclosed in FIG. 1 and processes the encoded video signal to produce a first decoded video signal. The first decoded video signal is applied to an output selector 70. Secondly, if the retrieved video signal is the decoded video signal recorded in the second recording mode, the decoded video signal is directly passed through line OP2 to the output selector 70 as a second decoded video signal. Lastly, if the retrieved video signal is the intra-mode compressed video signal recorded in the third recording mode, the retrieved intra-mode compressed video signal is sent through line OP3 to an intra-mode decoder 60 which processes it to produce a third decoded video signal. The third decoded video signal is also applied to the output selector 70.

The recording mode signal detected by the recording mode detection and distribution unit 45 is also provided to the output selector 70 through line 48. The output selector 70, in response to the recording mode detection signal from the mode detection and distribution unit 45, selectively outputs a corresponding decoded video signal for its display or reproduction.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus having a recording and reproducing unit for recording and reproducing an encoded digital video signal received from a transmitter, which comprises:

a first means for passing the encoded video signal for the direct recording thereof in a first recording mode;

a second means for processing the encoded video signal to produce a decoded video signal for the recording thereof in a second recording mode;

a third means for processing the encoded video signal to produce an intra-mode compressed video signal for the recording thereof in a third recording mode;

means for generating a first, a second and a third recording mode control signals representing the first, the second and the third recording modes, respectively;

an input selector for selecting one of the video signals from the first, the second and the third means in accordance with the first, the second or the third recording mode control signal and providing the selected video signal and its associated recording mode to the recording and reproducing unit for the recording and reproducing thereof;

a recording mode detection and distribution unit, when the video signal is reproduced by the recording and reproducing unit, for detecting the recording mode of the reproduced video signal and distributing the reproduced video signal in accordance with the detected recording mode;

a fourth means for processing the reproduced video signal distributed thereto for the reproduction thereof, wherein the reproduced video signal is the encoded video signal directly recorded in the first recording mode;

a fifth means for passing the reproduced video signal distributed thereto for the reproduction thereof, wherein the reproduced video signal is the decoded video signal recorded in the second recording mode; and a sixth means for processing the reproduced video signal distributed thereto for the reproduction thereof, wherein the reproduced video signal is the intra-mode compressed video signal recorded in the third recording mode, wherein the third means includes:

an intra-mode transformer for transforming the encoded video signal to the intra-mode compressed video signal, said intra mode transformer containing:

a decoder for decoding the encoded video signal to produce a decoded video signal; and an encoder block for encoding the decoded video signal using an intraframe correlation to produce the intra-mode compressed video signal, said encoder block having a discrete cosine transform coder for transforming the decoded video signal into a set of intra-mode transform coefficients, an intra-mode quantizer for quantizing the set of intra-mode transform coefficients using a quantization step size to produce an intra-mode quantization signal, and a variable length coder for coding the intra-mode quantization signal to produce the intra-mode compressed video signal.

2. The apparatus as recited in claim 1, wherein the second means includes a decoder for decoding the encoded video signal to produce the decoded video signal, the decoded video signal being a pulse code modulated signal.

* * * * *